June 1, 1943.　　　W. MAHNKEN　　　2,320,628
PUSH BUTTON DEVICE
Filed May 11, 1940
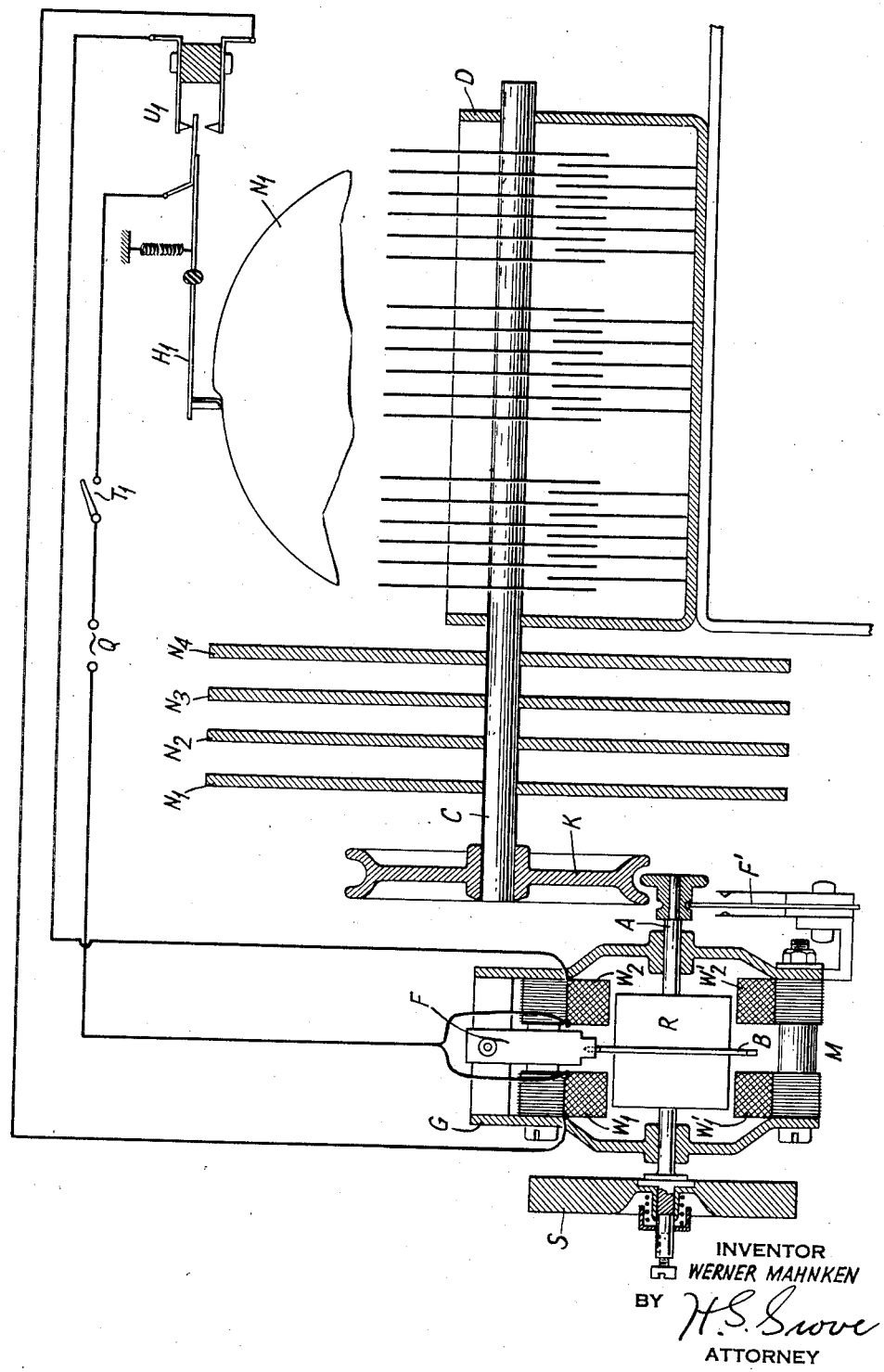
INVENTOR
WERNER MAHNKEN
BY
H.S. Snove
ATTORNEY

UNITED STATES PATENT OFFICE 2,320,628

PUSH BUTTON DEVICE

Werner Mahnken, Berlin, Germany; vested in the Alien Property Custodian

Application May 11, 1940, Serial No. 334,673
In Germany January 17, 1939

3 Claims. (Cl. 172—240)

Arrangements are known for the push button tuning of a receiver to one, or several transmitters wherein there is provided a motor which is coupled with the tuning device to be set, for instance, the variable condenser of the receiver. In such devices a switching device permits of setting the motor for clockwise rotation on the one side of the predetermined position and for counterclockwise rotation on the other side of the predetermined position while in the desired position the motor will be shut off automatically. This switching device may be an annular contact disk composed of two parts, or an ordinary reversing switch which is controlled by a cam disk mounted on the shaft of the variable condenser. In place of a motor whose direction of rotation can be reversed, a motor may be employed which rotates continuously in the same direction together with a coupling device which is automatically reversed by the switching device.

In such arrangements in order to realize a possibly accurate setting it is of advantage to render as narrow as possible the intermediate position of the switching device in which the variable condenser is not operated. If on the other hand the operation is carried out with a comparatively high setting speed, it cannot be avoided that the setting is carried beyond the desired position. The correct position will then be reached only after a certain reciprocating movement. It is true that attempts have been made to provide an axial decoupling of the rotor of the motor so that in the no-current state, which is in the center position, the motor will be decoupled automatically. At a high setting speed and narrow range of the center position, hence, when the motor receives no current, this measure is however, of no avail. Moreover, the idea lies near to provide a brake which is controlled by the current and which acts on interruption of the current, thereby preventing the setting means from moving beyond the desired position. But for the above mentioned conditions at which the duration of the no-current state is perhaps only 1/1000 second, the brake can practically not become effective.

In accordance with the present invention the motor is so designed that it will as such be moved, or its rotor be moved axially into a decoupled position towards one side when the motor rotates in the clockwise direction and towards the other side when it rotates in the counter-clockwise direction while in the center position a device is effective which brakes, or stops the rotation.

The advantage of the present invention is seen in the fact that even if the switching period is extremely short the motor must pass automatically through the position in which the brake device is effective. Therefore, a passing beyond the desired position by a wider distance is not possible despite the high speed of setting.

An example of construction according to the present invention is shown in the accompanying figure. The stator of the motor M has four coils $W_1$, $W_1'$, $W_2$, $W_2'$ of which the coils $W_1$ and $W_1'$ which are connected in parallel serve for the clockwise rotation while the coils $W_2$ and $W_2'$ which are likewise placed in parallel serve for the counter-clockwise rotation of the motor. The shaft A which can be moved axially in either direction relative to the position of rest as shown, has mounted thereon the rotor R designed as short-circuit rotor. At excitation of the clockwise rotation coils $W_1$, $W_1'$ this rotor is shifted to the left into the decoupled position and at excitation of the counterclockwise rotation coils $W_2$, $W_2'$ the rotor is shifted to the right into the decoupled position. At the no-current state a spring device $F'$ pulls the rotor into the resting position herein shown. In this position a flat spring F fastened to the housing G of the motor engages incisions of a brake cam disk B mounted on the rotor, whereby said flat spring prevents, or at least hinders the rotation of the motor.

It is only in the decoupled positions to the right or to the left that a free rotation is possible. In either of these two positions the rotor shaft is coupled across the coupling disk K with the shaft C of the variable multiple condenser D.

For the setting to several predetermined receiving frequencies the shaft C carries a corresponding number of cam disks, thus, for four stations there would be four cam disks $N_1$, $N_2$, $N_3$ and $N_4$ whereby the one disk ($N_1$) is shown in part in the plane at right angle to the drawing plane. The circumference of the cam disk controls across a yieldingly pressed-on lever $H_1$ a reversing switch $U_1$ which according to its position places the voltage coming from the voltage source Q either at the clockwise rotation coil, or at the counterclockwise rotation coil of the motor, provided that the appertaining switch $T_1$ actuated by a push button is closed. It is only in the very narrow center position in which the control pin of the lever $H_1$ rests exactly on the edge of the cam of the disk $N_1$ that the motor receives no current.

At closing switch $T_1$ the rotor is shifted for instance to the left and starts in the clockwise direction. On reaching, or passing beyond the edge of the cam, i. e. in the desired position, in place of the coil pair $W_1$, $W_1'$ the coil pair $W_2$, $W_2'$ will be excited. Owing to the inertia of the motor the same would as such still rotate in the previous direction. But the axial force which becomes immediately effective pulls the rotor R to the right. The rotor is accordingly brought into the center position in which the spring F retains the brake cam disk B and thus also the shaft A. It is only then that the rotor enters the field of the coil pair $W_2$, $W_2'$ and moves in the counterclockwise rotation back to the desired position. Since the distance by which the desired position has been passed over is relatively short a rapid swinging-in is assured.

The retractive force of the spring arrangement F' can be rendered small against the magnetic axial force. Moreover, this retractive force acts in the direction in which the magnetic axial force acts, during the first half period of the axial shifting from left to right, so that the acceleration of the axial movement will be increased still further. Since in the known arrangements when the excitation of the one coil ceases the motor is pulled back into the neutral position solely by a retraction spring, whose retractive force is lower than the magnetic axial force (acting in this case towards one side only), it is clear that the axial movement and the decoupling are carried out very much faster in the present case.

The shaft A also carries a flying disk or flywheel S which can turn when overcoming friction and which is intended to stop the speed of rotation on the reversal of the movement. In the hitherto known arrangement this flying disk proved disadvantageous inasmuch as the first distance by which the desired position was passed over was even increased instead of reduced. In applying the present invention this flying disk is fully active since owing to the brake cam disk B the rotor will be retarded soon after the desired position is passed over. The flying disk which continues to move in the old direction of rotation then slows down the return movement so that practically a repeated movement past the desired position is avoided. The inertia of the flying disk and its friction on the shaft may even be chosen substantially higher than is the case in the known arrangement.

In order to increase the accuracy, the cam disks $N_1$—$N_4$ can be replaced by threaded drums having several turns, or disks may be employed whose side faces have each a spiral groover of different depth, whereby the control pins of the levers engage the appertaining grooves.

The coupling disk K is shown in a form that in the center position the motor is decoupled. However, the arrangement may also be so chosen that there always exists a coupling (in that K is given a flexibility) so that likewise a continued movement of the driven parts owing to their inertia will likewise be avoided in the intermediate position of the motor.

Where a coupling device which is reversed by the switch $U_1$ is present it is likewise necessary to provide two coil systems arranged in different planes and which are to be energized alternatively by the switch $U_1$ whereby at excitation of the one coil the motor is again pulled to the left from the central position in which the braking device is active, and it is pulled to the right when the other coil is excited. However, both coil systems must drive the motor in the same direction of rotation. The reversing of the coupling device can be effected in this case simply by the axial decoupling of the rotor shaft across bevel gears, or the like.

Finally, there exists the possibility of employing a motor which can be switched to clockwise rotation, or counter-clockwise rotation in which however, the rotor shaft is not arranged for axial shifting relative to the stator. In this case the stator of the motor can be mounted rotatably for a small angle and the rotary movement of the stator can be converted into an axial movement of the entire motor by means of a screw, or the like. Also in this case the motor haft shifts axially towards the one side at the clockwise movement and towards the other side at the counterclockwise movement. In the central position assumed in the no-current state in which position the motor is retained by a retractive force, a braking device must again be active which holds the rotor, or the device to be set.

I claim:

1. In a reversible electric motor assembly, a rotor therefor shiftable between two extreme positions, a first motor winding acting upon energization to cause rotation of the motor in one direction and to axially shift the rotor to one of said extreme positions, a second motor winding acting upon energization to cause rotation of the motor in the other direction and to axially shift the rotor to the other of said extreme positions, and means adapted to engage the rotor in a position intermediate said two extreme positions when neither of said motor windings is energized for maintaining the rotor in locked position.

2. In a reversible electric motor assembly as described in claim 1, a motor shaft rotatable with said rotor, a driven shaft, and means at one end only of the motor shaft and the driven shaft providing a driving connection therebetween only when said rotor is in the vicinity of either one of its extreme positions.

3. In a reversible electric motor assembly as described in claim 1, a driven shaft, a motor shaft, means at one end only of the motor shaft and the driven shaft providing a driving connection therebetween only when the rotor is in the vicinity of either one of its two extreme positions, means rotatable with the driven shaft for controlling the direction of operation of said motor in accordance with the position of the driven shaft, said means also acting to cause de-energization of the motor windings when the control shaft is in a predetermined position.

WERNER MAHNKEN.